C. W. WILLIAMS.
Hay-Loaders.

No. 157,954. Patented Dec. 22, 1874.

WITNESSES
F. A. Herring
A. D. Rich

INVENTOR
Charles W. Williams
By Gridley & Warner
attys

UNITED STATES PATENT OFFICE.

CHARLES W. WILLIAMS, OF ROCHELLE, ILLINOIS.

IMPROVEMENT IN HAY-LOADERS.

Specification forming part of Letters Patent No. 157,954, dated December 22, 1874; application filed October 17, 1874.

*To all whom it may concern:*

Be it known that I, CHARLES W. WILLIAMS, of Rochelle, in the county of Ogle and State of Illinois, have invented a new, useful, and Improved Hay-Loader, of which the following is a full, clear, and exact description, which will enable others skilled in the art to which my invention appertains to make and use the same, reference being had to the accompanying drawing forming a part hereof, and in which—

Figure 1:
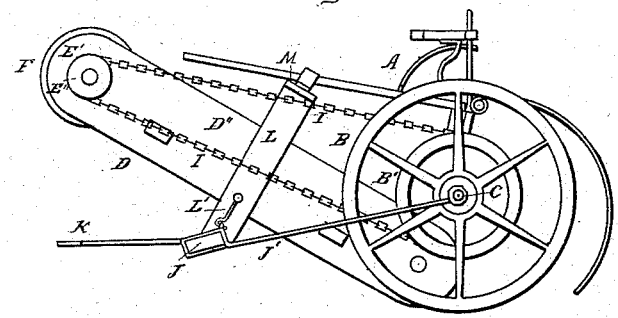
Figure 2:
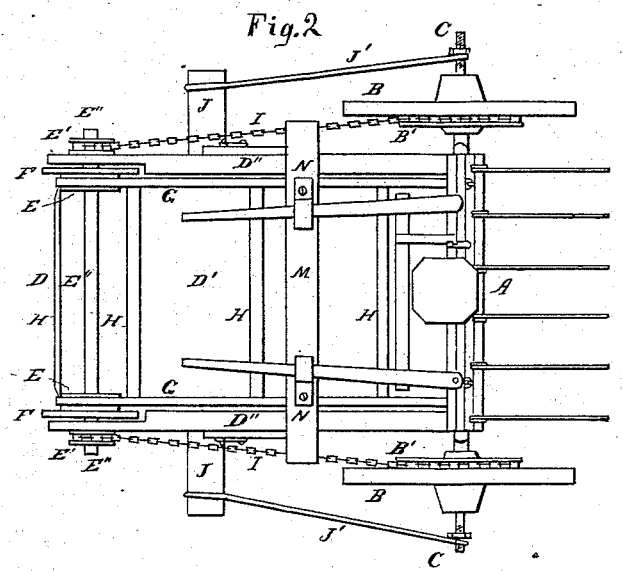

Figure 1 represents a side elevation of a loader embodying my invention, and Fig. 2 a top or plan view thereof.

Like letters of reference indicate like parts.

The object of my invention is to make an elevator adapted for use either in connection with any horse hay-rake or with a rake of that class especially adapted for use in connection with the elevator, and in such a way that the rake may be used alone in the usual manner, the two, when used together, constituting a hay-loader.

In the drawing, A represents an ordinary horse hay-rake, excepting that either one or both of the wheels B B are provided with pulleys B' B', consisting, preferably, of rag-wheels rigidly attached to the spokes, and concentric with the axles C C. D is an elevator or loading attachment. D' is the platform of the elevator, and D'' D'' are the side pieces thereof. E E' are pulleys rigidly mounted on a shaft, E'', arranged in one end of the elevator. F F are removable wheels, also rigidly set on the shaft E'' when an ordinary horse hay-rake is employed in connection with the elevator; but in the latter case, instead of being arranged on the front end, as shown, the said shaft and wheels are arranged on the rear end of the elevator, and are only shown upon the front end thereof, for the purpose of illustrating their relation to the endless slatted conveyer-apron, hereinafter described. G G are endless belts or chains passing over the pulleys E E and over pulleys in the opposite end of the elevator. H H are cross-bars attached to the belts G G, the said slats and belts forming the continuous apron above referred to. I are endless chains arranged over the pulleys B' and E'. J is a cross-bar suspended in removable connecting-rods J' J', freely mounted on the axles C C. K is a draw-bar attached to the bar J. L L are standards, preferably vertically adjustable on the sides D'' D'', and resting on the bar J, the lower ends of the said standards being preferably notched to receive the said bar, as shown in Fig. 1. L' L' are hooks on the standards L L, said hooks engaging eyes or staples on the bar J, thus firmly connecting the elevator to the rake. M is a thill-support, provided with lugs N N, arranged to lie on each side of the thills and preventing the lateral movement of the latter on their support, and also preventing the thills from being tilted upward.

It will be perceived, from the foregoing description, that the horse hay-rake may be easily detached from the elevator and used alone in the usual manner.

The mode of attaching the rake and elevator to each other, so that both may be used together as a loader, is also simple.

Although the elevator and rake are firmly attached to each other by the means described, yet this attachment should not be so firm as to prevent the rear end of the elevator from yielding to uneven ground without lifting the wheels of the rake.

In order to use the elevator and rake together, the draft-bar is attached to the rear end of the wagon and the cut grain or grass gathered by the rake falls upon the conveyer, and is thus delivered into the wagon, it being understood that the conveyer is actuated by the chains I I. The wheels F F are not essential when the elevator is driven by the chains I I.

In order to use the elevator in connection with a horse hay-rake not thus adapted for attachment to it, the wheels F F are arranged in the rear end of the elevator, so as to ride upon the ground, and thereby actuate the elevator. The elevator is then attached to the horse hay-rake by means of the connecting-rods J' J', or their equivalents, in a manner substantially the same as described.

The cut grain or grass will thus be cleanly swept from the ground.

Having thus described my invention, what I claim as new, and desire to secure by Letters Patent, is—

In combination, the horse hay-rake, provided with the wheels or pulleys B' B' and with the removable draft device J' J' J K, the elevator D connected to the draft device, and one or more chains, I I, substantially as and for the purposes specified.

CHARLES W. WILLIAMS.

Witnesses:
F. F. WARNER,
F. H. HERRING.